June 17, 1941.  E. W. MERRY  2,245,995
DRILL
Filed April 10, 1939

Inventor
Earl W. Merry
By Owen & Owen
Attorneys

Patented June 17, 1941

2,245,995

UNITED STATES PATENT OFFICE 2,245,995

DRILL

Earl W. Merry, Dunkirk, Ind.

Application April 10, 1939, Serial No. 267,165

2 Claims. (Cl. 255—61)

This invention relates to drills particularly adapted for boring glass or other vitreous or ceramic materials and is particularly directed to the formation of a drill of this character which reduces the tendency toward splitting and chipping of the material being drilled.

Another object of the invention is the provision of a drill for such uses which is easily sharpened and which holds its cutting edges for a long period.

Another object of the invention is the provision of a tool which may be sharpened by grinding a single surface.

Other objects and advantages of the invention will become apparent as the description proceeds, reference being had to the accompanying drawing, in which—

Figure 4:
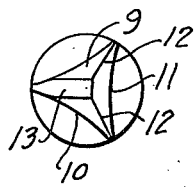
Fig. 4 is an end view.
Figure 5:
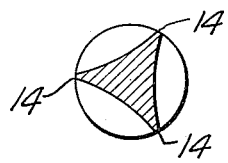
Fig. 5 is a section on line 5—5 of Fig. 1.
Figure 6:
Fig. 6 is a fragmentary section taken on line 6—6 of Fig. 1.

Referring to the drawing, the drill includes a shank 8 from which are formed three surfaces 9, 10 and 11, so that the drill, as shown in Figs. 4 and 5, is triangular in cross-section.

Figure 1:
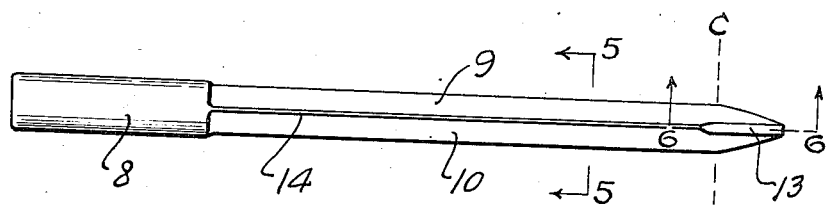
Figure 1 is a plan view of a drill embodying the present invention.
Figure 2:
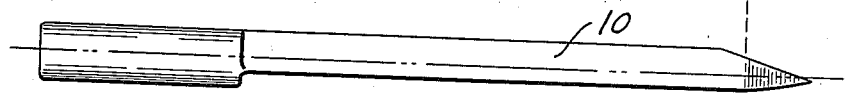
Fig. 2 is an elevation of one side thereof.
Figure 3:
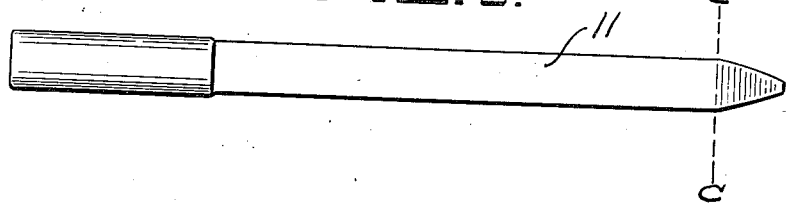
Fig. 3 is an elevation of another side thereof.

The drill is pointed at its working end, being convergent from line C—C in Figs. 1, 2 and 3, so as to form sharp cutting edges 12 between the surface 11 and its line of junction with the surfaces 9 and 10. Between the surfaces 9 and 10, however, a plane relieving surface 13 is provided which carries back into the widest portion of the drill, i. e., to the point of greatest diameter.

As shown in Figs. 4 and 5, except for the pointed end, the surfaces 9, 10 and 11 do not meet directly but terminate in longitudinal lines which act as reaming edges 14 when this portion of the tool is active.

An important feature of the present invention resides in the fact that each of the surfaces 9, 10 and 11 is made concave. The concavity permits the tool to be sharpened readily on a grinding wheel and also provides a greater relief so that chips and ground-off material may pass out of the hole being drilled. The sharpening of the drilling point may be accomplished merely by grinding the surface 11 to produce the two sharp meeting edges 12 so that it is unnecessary, under ordinary circumstances, to sharpen the tool by grinding either of the remaining surfaces 9 or 10.

A drill constructed in accordance with the present invention has been found to be particularly advantageous where it is desired to drill entirely through a body of glass or ceramic material, since the tendency to chipping is greatly reduced. This is probably due to the concavity of the surfaces which form the drilling point in conjunction with the relief provided by the plane surface 13. The plane surface provides an excellent opportunity for lubricant to be spread in the hole even when the point of the drill has passed entirely through the material. It will be noted that the plane surface 13 maintains a uniform width to a point at least beyond the thickest dimension of the drill, or beyond the line C—C where the surfaces 9, 10 and 11 begin to converge to form the drilling point. It is important that the clearance provided by this surface be maintained constant at least to this dimension.

The drill is operated in the usual manner by subjecting it to a rotating movement on the material to be bored. As the drilling progresses chips and drilled out material have an opportunity to pass out freely from the hole by reason of the concavity of the surfaces, and by reason of the plane surface 13. It will be seen that the actual cutting is done by the edges 12 and that the surface 13 lies between such edges so that chips have an opportunity to pass out away from that portion of the material which is being drilled. When the point of the drill passes entirely through the material so that the hole is being reamed by the extreme ends of the edges 14, relief is still provided by reason of the extent of the plane surface 13. It is not until after the hole has assumed its maximum diameter that the plane surface 13 is at all reduced in width to allow its adjacent edge 14 to touch the side of the hole. It will be further seen that the concave sides of the drill continue in this formation through the entire length of the working portion of the tool.

While the invention has been described in its preferred embodiment, various modifications and changes will suggest themselves to those skilled in the art and such modifications and changes may be made without departing from the invention as set forth in the appended claims.

What I claim as new and desire to secure by United States Letters Patent is:

1. A drill of the class described, including a generally triangular body, the surfaces of which are concave, a drilling point formed by the convergence of the surfaces of said triangular body and having three concave surfaces, and a plane relief surface for said drilling point formed as a flat surface at the meeting edge of two adjacent concave surfaces of said drilling point.

2. A drill in accordance with the preceding claim in which said plane relief surface continues undiminished in width at least beyond the widest dimension of said drilling point.

EARL W. MERRY.